(12) United States Patent
Hariri

(10) Patent No.: US 10,110,868 B2
(45) Date of Patent: Oct. 23, 2018

(54) IMAGE PROCESSING TO DETERMINE CENTER OF BALANCE IN A DIGITAL IMAGE

(71) Applicant: Aestatix LLC, New York, NY (US)

(72) Inventor: Amir R. Hariri, Long Island City, NY (US)

(73) Assignee: Aestatix LLC, New York, NY (US)

(*) Notice: Subject to any disclaimer, the term of this patent is extended or adjusted under 35 U.S.C. 154(b) by 0 days.

(21) Appl. No.: 15/852,780

(22) Filed: Dec. 22, 2017

(65) Prior Publication Data

US 2018/0184062 A1    Jun. 28, 2018

Related U.S. Application Data

(60) Provisional application No. 62/438,307, filed on Dec. 22, 2016.

(51) Int. Cl.
*G06K 9/00*      (2006.01)
*H04N 9/73*      (2006.01)
(Continued)

(52) U.S. Cl.
CPC .............. *H04N 9/735* (2013.01); *G06F 21/32* (2013.01); *G06F 21/6218* (2013.01); *G06T 7/13* (2017.01);
(Continued)

(58) Field of Classification Search
CPC . H04N 9/735; H04N 9/07; G06T 7/13; G06T 7/90
See application file for complete search history.

(56) References Cited

U.S. PATENT DOCUMENTS 6,671,405 B1    12/2003    Savakis et al.
6,816,847 B1    11/2004    Toyama
(Continued)

FOREIGN PATENT DOCUMENTS

CN          103218619 A      7/2013
WO     2015066891 A1      5/2015

OTHER PUBLICATIONS

Datta R. et al., "Studying Aesthetics in Photographic Images Using a Computational Approach", European Conference on Computer Vision, ECCV 2006: Computer Vision—ECCV 2006, pp. 288-301.
(Continued)

*Primary Examiner* — Gregory M Desire
(74) *Attorney, Agent, or Firm* — Fox Rothschild LLP

(57) ABSTRACT

An image processing system acquires a digital image and determines notional weights for each pixel in the image. The notional weight of each pixel relates to the pixel's color value of the pixel and may include adjustments. The system uses the notional weights for each pixel to determine a center of balance (CoB) for the image. The system may then determine an eccentricity of the CoB based on a distance between the CoB and a specified location in the digital image. The system may calculate an aesthetic score for the digital image as a function of the determined eccentricity. The system may display an augmented reality overlay on the image to show the CoB and/or other determined features. The system may use the CoB, eccentricity or aesthetic value to help improve a real-time image capture process, in a security protocol, and/or to determine whether to retain an image in memory.

25 Claims, 8 Drawing Sheets

(51) Int. Cl.
*G06T 7/13* (2017.01)
*G06T 7/90* (2017.01)
*G06F 21/32* (2013.01)
*G06F 21/62* (2013.01)
*H04N 5/232* (2006.01)
*H04N 9/07* (2006.01)
*G06F 3/0484* (2013.01)
*G06T 7/00* (2017.01)
*G06T 19/00* (2011.01)

(52) U.S. Cl.
CPC ............ *G06T 7/90* (2017.01); *H04N 5/23216* (2013.01); *H04N 5/23222* (2013.01); *H04N 5/23293* (2013.01); *H04N 9/07* (2013.01); *G06F 3/04842* (2013.01); *G06F 3/04845* (2013.01); *G06T 7/0002* (2013.01); *G06T 19/006* (2013.01); *G06T 2200/04* (2013.01); *G06T 2207/10024* (2013.01); *G06T 2207/30168* (2013.01); *G06T 2207/30201* (2013.01); *G06T 2210/22* (2013.01)

(56) References Cited

U.S. PATENT DOCUMENTS

| | | | |
|---|---|---|---|
| 7,369,699 B1 | 5/2008 | Christie | |
| 8,238,615 B2 | 8/2012 | Cerosaletti et al. | |
| 8,311,364 B2 | 11/2012 | Cerosaletti et al. | |
| 8,315,473 B1 | 11/2012 | Tao et al. | |
| 8,330,826 B2 | 12/2012 | Cerosaletti et al. | |
| 8,462,384 B2 | 6/2013 | Christie | |
| 8,594,385 B2 | 11/2013 | Marchesotti et al. | |
| 8,660,342 B2 | 2/2014 | Obrador et al. | |
| 8,681,087 B2 * | 3/2014 | Otoi | G09G 3/3426 345/102 |
| 8,712,157 B2 | 4/2014 | Marchesotti et al. | |
| 8,732,172 B2 | 5/2014 | Tan et al. | |
| 8,781,175 B2 * | 7/2014 | Wang | G06K 9/00624 382/112 |
| 8,995,725 B2 | 3/2015 | Li et al. | |
| 9,013,497 B2 | 4/2015 | Aydin et al. | |
| 9,082,047 B2 | 7/2015 | Marchesotti | |
| 9,142,012 B2 * | 9/2015 | Lim | G06T 5/20 |
| 9,262,696 B2 | 2/2016 | Ratcliff et al. | |
| 9,286,325 B2 | 3/2016 | Murray et al. | |
| 9,292,756 B2 | 3/2016 | Welinder et al. | |
| 9,311,361 B1 | 4/2016 | Nonaka et al. | |
| 2004/0059754 A1 | 3/2004 | Barghout et al. | |
| 2006/0072158 A1 | 4/2006 | Christie | |
| 2008/0285860 A1 | 11/2008 | Datta et al. | |
| 2010/0310158 A1 * | 12/2010 | Fu | G06K 9/00362 382/159 |
| 2013/0114894 A1 | 5/2013 | Yadav et al. | |
| 2014/0029843 A1 | 1/2014 | Obrador Espinosa et al. | |
| 2014/0250110 A1 | 9/2014 | Yang et al. | |
| 2015/0220806 A1 | 8/2015 | Heller et al. | |
| 2016/0098618 A1 | 4/2016 | Shaji et al. | |
| 2016/0140157 A1 | 5/2016 | Li et al. | |
| 2018/0012630 A1 * | 1/2018 | Thomee | G11B 27/036 |

OTHER PUBLICATIONS

Campbell, A., "Self organising map based method for understanding high aesthetic value abstract image features", Royal Melborne Institute of Technology, Nov. 4, 2013.

Jiang W. et al., "Automatic Aesthetic Value Assessment in Photographic Images", Eastman Kodak Company, Apr. 21, 2010.

Li, C. et al., "Towards Aesthetics: a Photo Quality Assessment and Photo Selection System", Aug. 15, 2010.

* cited by examiner

IMAGE PROCESSING TO DETERMINE CENTER OF BALANCE IN A DIGITAL IMAGE

RELATED APPLICATIONS AND CLAIM OF PRIORITY

This patent document claims priority to U.S. provisional patent application No. 62/438,307, filed Dec. 22, 2016, titled "Systems, Devices and Methods for Determinations of Centers of Balance for Compositional Classifications of Aesthetic Values of Images Using Notional Weights of Pixels." The disclosure of the priority application is fully incorporated into this document by reference.

BACKGROUND

The disclosure relates to the field of digital image capture, processing, composition analytics and feedback.

As repositories of digital images grow, they use up an ever-increasing amount of the storage capacity of electronic devices. As users of smartphones and other mobile electronic devices use the devices' cameras to capture even the most mundane of images, captured images can quickly fill up most or all of the available memory in the device. This problem is compounded in cloud-based data storage facilities, where users back up entire collections of digital photos, many of which may be very similar to each other.

In addition, users of camera-equipped digital devices seek images of higher quality. Both professional and amateur photographers seek ways to capture images that are aesthetically pleasing. While many digital cameras are equipped with image capture assist technology such as grid overlays that help guide a user when framing a picture, technology is not currently available to process an image in real-time and then guide a user as to what adjustments should be made to acquire an additional image that is more aesthetically pleasing, or to help select a most aesthetically pleasing digital image from a corpus of similar images. In addition, as images are increasingly taken by robotic systems (such as aerial drone-mounted cameras rather than humans), there is an increased need to help such systems capture images that will be considered to be of higher aesthetic quality.

The field of aesthetics primarily deals with the analysis of images in order to establish notions of perceived beauty. Formalism, the study of image beauty with respect to realization and position of depicted forms and colors, is the basis of such analysis. The notion of a pictorial balance has been a central tenant in the formal analysis of images and their beauty. Although there have been many references made to balance and harmony within images throughout the history of the visual arts, only recently have we seen attempts to quantify such balance points using computational methods. The proximity of a rudimentary center of mass calculation to the center of the image does show meaningful correlation to viewer preference.

However, the proximity of a center of mass to the center of the image still only provides a limited way of determining pictorial balance. In addition, these methods do not necessarily help when capturing an image, or when editing/cropping the image after the initial capture.

Web and personal image repositories, which include works of art, are dramatically increasing with the introduction of ever simplified documentation and upload features in personal devices, creating the need for computational algorithms that are able to automatically discern the aesthetically appealing from the unappealing. No current system provides effective real-time feedback for improving image composition.

SUMMARY

In various embodiments, a system that includes a processor accesses a digital image containing pixel data. The pixel data includes one or more color values for various pixels in the digital image. Each color value corresponds to a color channel, such that each of the pixels is associated with a color channel that corresponds to the color value in the pixel data for the pixel. For each of the color channels, the system will determine a first notional weight for each pixel that is associated with the color channel. The first notional weight is a function of the color value of the pixel, or in some situations the first notional weight may be the color value itself. The system will determine an adjusted notional weight for each pixel by adjusting the first notional weight for the pixel by (i) an edge coefficient having a value corresponding to a proximity of the pixel to a detected edge in the image, and (ii) a location coefficient having a value corresponding to a proximity of the pixel to a determined point of interest in the image. The system will then determine an initial center of balance (CoB) for the color channel as a function of the adjusted notional weights of each of the pixels that are associated with the color channel. The system may then determine a final CoB for the image based on the initial CoBs for each of the color channels.

If there are multiple color channels in the image, such as R, G and B channels in accordance with an RGB color model, then the final CoB may be a weighted average of the initial CoBs for each of the color channels. If the color channels consist of a single greyscale color channel, then the initial CoB also may be the final CoB.

To determine the initial CoB for each color channel, if the image is a two-dimensional image the system may use the formula:

$$CoB_{x,y} = \frac{\sum_{i=1}^{n}(x_i, y_i) * w_i(t)_{adj}}{\sum_{i=1}^{n} w_i(t)_{adj}}$$

wherein: i represents each image element that is associated with the color channel; n is the total number of image pixels that are associated with the color channel; $(x_i, y_i)$ represents coordinates in the image of each pixel that is associated with the color channel (with $x_i$ being the x-coordinate of pixel i and $y_i$ being the y-coordinate of pixel i); $w_i(t)_{adj}$ is the adjusted notional weight of each pixel that is associated with the color channel; and $CoB_{x,y}$ represents a location (x,y) of the CoB. The use of x,y in the equation above indicates that the equation will be solved twice, once for x and once for y, so that the coordinates of the CoB are the resulting $CoB_x$ and $CoB_y$.

If the image is a three-dimensional image the system may use the formula such as the following, which includes z-dimension coordinates and which will be solved three times, once each for x, y, and z so that the coordinates of the CoB are the resulting $CoB_x$, $CoB_y$ and $CoB_z$:

$$CoB_{x,y,z} = \frac{\sum_{i=1}^{n} (x_i, y_i, z_i) * w_i(t)_{adj}}{\sum_{i=1}^{n} w_i(t)_{adj}}$$

Optionally, for each of the color channels, the system may determine the first notional weight for each pixel as $w(t)_1=255-t$, wherein t is the color value for the color channel of the pixel. The system may then determine a second notional weight for the color channel as $w(t)_2=t$. When determining the initial CoB for the color channel, the system may use the adjusted notional weights to determine a first CoB for the color channel and use additional adjusted notional weights based on the second notional weight to determine a second CoB for the color channel. Determining the final CoB for the color channel may then include determining a weighted average of the first CoB and the second CoB for the color channel.

The system may acquire the digital image in various ways. For example, the system may include a camera with an image sensor that acquires the image. The system may then generate an image matrix that includes the pixel data and process the image in real-time as it is being acquired. Alternatively, the system may retrieve the digital image from memory as a file with the pixel data.

The system may include a camera and functions to assist the user in a photo-taking process. For example, the system may determine whether the final CoB is proximate to an optimal CoB in the image. If the final CoB is not proximate to the optimal CoB, the system may cause a user interface of the camera to output an instruction to prompt a user of the camera to adjust a position or a zoom setting of the camera. The camera may then, either upon user activation or automatically upon completion of the adjustment, acquire a second image after the position or the zoom setting is adjusted.

In some embodiments, the system may use the final CoB to determine an aesthetic score for the image. To determine the aesthetic score, the system may determine an eccentricity of the final CoB based on a distance between the final CoB and a specified location in the image. The system may then calculate the aesthetic score as a function of the determined eccentricity. The specified location may be, for example, a point that is the center of the image, a point that is on a major axis of the image, a rule of third power point in the image, or a function of any or all such points.

The system may cause a user interface to output the aesthetic score. The system also may use the aesthetic score to determine whether to retain the image in a data store. To use the aesthetic score to determine whether to retain the digital image in a data store, the system may determine whether the aesthetic score exceeds a threshold, determine whether the digital image contains a face of a subject, determine whether the final CoB appears within the face of the subject, and retain the digital image in the data store only if the aesthetic score exceeds the threshold, the digital image contains the face of the subject and the final CoB appears within the face of the subject. Otherwise, the system may delete or otherwise not cause the digital image to be retained in the data store.

In another embodiment, a method of processing a digital image to assess image quality includes acquiring a digital image containing pixel data representing an image. The pixel data includes one or more color values for each pixel of a group of pixels. The method includes determining a notional weight for each pixel as the color value or a function of the color value of the pixel, and then using the notional weight for each pixel to determine a center of balance (CoB) for the digital image. The method also includes determining an eccentricity of the CoB based on a distance between the CoB and a specified location in the digital image, as well as calculating an aesthetic score for the digital image as a function of the determined eccentricity.

In another embodiment, a digital image processing system includes a camera, a processor, and a computer-readable medium containing programming instructions that are configured to cause the processor to detect that the camera is acquiring a digital image containing pixel data representing an image. The pixel data includes one or more color values for each pixel of a group of pixels. In real-time while the camera is acquiring the digital image, the instructions will cause the processor to determine a notional weight for each pixel as the color value or a function of the color value of the pixel, and to use the notional weight for each pixel to determine a center of balance (CoB) for the digital image.

The system may include additional programming instructions that are configured to cause the processor to, in real-time while the camera is acquiring the digital image: (i) determine an eccentricity of the CoB based on a distance between the CoB and a specified location in the digital image; and (ii) calculate an aesthetic score for the digital image as a function of the determined eccentricity.

The system also may include a display and additional programming instructions that are configured to cause the processor to, in real-time while the camera is acquiring the digital image or after retrieving a captured image from a memory: (i) cause the display to output the digital image; and (ii) cause the display to output an augmented reality overlay identifying the CoB. If the system outputs an augmented reality overlay showing the CoB on a captured image, it may also display guidelines on a display that outputs the image and the augmented reality overlay, and it may enable a user of an electronic device that includes the display to use the guidelines to crop the digital image.

In any of the embodiments described above, the system may use a user interface of an electronic device to provide a user of the device's camera with feedback in an image capture or editing process. The feedback may include, for example, a visual indicator of the eccentricity, a visual indicator of the aesthetic score, or an augmented reality overlay showing the CoB on the image.

In some embodiments, the system may receive a user identifier for a user whose face appears in the digital image. If so, it may identify a code that corresponds to the final CoB, and use the code and the user identifier as credentials to enable the user to access a secure system.

In some embodiments, after determining the CoB for an image the system may create an augmented image by identifying a content item and placing the content item in the image at the CoB to yield a modified image. The system may save the modified image to a memory and/or cause a display device to output the modified image.

In any of the embodiments described above, the system may cause a display of an electronic device to display a heat map showing each pixel of the image as a color having a value that corresponds to an adjusted notional weight that the system determines for that pixel.

DETAILED DESCRIPTION

Figure 1:
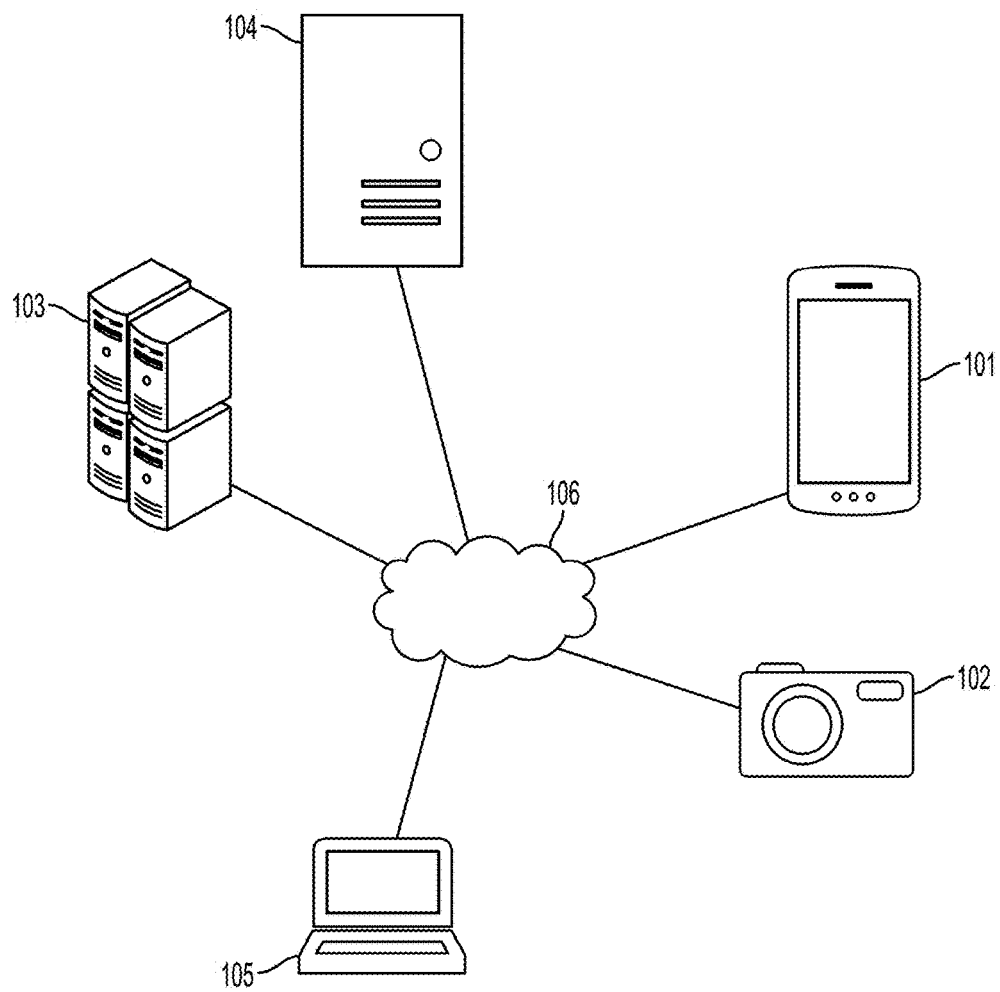
FIG. 1 illustrates example elements of a system for determining center of balance and assessing aesthetic value of digital images.

Terminology that is relevant to this disclosure includes:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such "first" and "second" are used to modify a noun, such use is simply intended to distinguish one item from another, and is not intended to require a sequential order unless specifically stated.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality and/or augmented reality and/or mixed reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below in the context of FIG. 8.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "imaging device" or "camera" refers generally to a hardware sensor that is configured to acquire digital images. An imaging device may acquire and save (and thus capture) still and/or video images, and optionally may be used for other imagery-related applications. For example, an imaging device can be held by a user such as a point and shoot camera, DSLR (digital single lens reflex) camera, a PTZ (pan tilt zoom) camera, a cell phone camera, and/or a video camera. The imaging device may be part of an image capturing system that includes other hardware components. For example, an imaging device may be part of a portable computing device such as a smartphone. An imaging device also may be mounted on an accessory such as a monopod or tripod. The imaging device also may be mounted on a transporting vehicle such as an aerial drone, a robotic vehicle, or on a piloted aircraft such as a plane or helicopter having a transceiver that can send captured digital images to, and receive commands from, other components of the system. Some imaging devices may capture 2-dimensional (2D) images in which image elements (e.g., pixels) have (x, y) coordinates. In some embodiments one or more of the imaging devices may be a three-dimensional (3D) camera, range camera, stereo camera, depth camera, virtual reality device, point cloud capture device or other device that captures 3D images in which image elements (e.g., voxels) have (x, y, z) coordinates. (For simplicity, except where specifically stated otherwise this document may use the term "pixel" to refer to both 2D pixels and 3D voxels.) In some embodiments, the imaging device may use any imaging wavelength (visible or infrared, etc.). In some embodiments, it may include a combination of various wavelength cameras and may combine their images.

This disclosure uses the strong correlation of compositional balance with image aesthetic quality to introduce a system of guidelines to measure a center of balance (CoB) for the image and then provide an aesthetic method of classification for the images based on the eccentricity, E, of the CoB from various compositional guidelines and rules such as image center, principal axis, the golden ratio, and/or rule of thirds power points. Using such mass/weight data, a loading diagram can be calculated for the image which, like a heat map, can be used to identify the various viewer focus points for use in image saliency detection.

FIG. 1 illustrates example elements of a system for classifying and measuring CoB for various images, and for assessing aesthetic value of those images. The system may include one or more imaging devices configured to capture digital images. Example imaging devices include a smartphone 101 equipped with an optical sensor and/or a digital camera 102. In addition or alternatively, the system may include a data storage facility 103 containing a set of digital image files.

A computing device 105 may serve as a user access device with a software application that provides a user interface via which a user may enter information into, and receive information from, the system. The user interface may be a touch screen, a keyboard or keypad, a microphone and a voice recognition module, an imaging device and an image recognition module, and/or other interface devices. In some embodiments, the application may be a thin client (such as a browser), and a server 104 contains and executes programming instructions that may provide the computing device 105 and/or other components of the system with various functions. Any or all of these components may be communicatively connected via one or more communication networks 106. In other embodiments, the application installed on the computing device may operate without requiring access to a remote server, and it may include the programming instructions needed to perform the image acquisition and analysis functions described in this document.

To determine the CoB for an image that is being acquired or has been captured by the imaging device, or for an image retrieved from the data store, the system may implement a method that includes pre-processing an image, generating an image matrix based on the pre-processing, submitting the image matrix to a processing engine such that the processing engine outputs a CoB of an image and a weight distribution heat map (loading diagram) for a selective input into an application programming interface (API) and a network-based image post-processor. The processing engine may determine a CoB location of the image and weight distribution heat map via:

(1) determining a notional weight (which is a value that the system may consider to be a psychophysical perceived weight by the viewer) for each pixel in the image based on pixel coordinates and pixel tone value for each pixel color channel (with each channel being red R, green G, blue B, greyscale or any other digital color format);

(2) using a tone (which may be a numeric value on a scale such as 0 to 255) of each pixel as a notional weight, with (on the example scale) 0 being lightest for white and 255 heaviest for black (image processing data assigns 0 for black and 255 for white so a reversal is required);

(3) adjusting the notional weight of each pixel based on coefficients that may be related to the psychology and neuroscience of human vision including but not limited to a location coefficient, a contrast coefficient, and obtaining an adjusted weight;

(4) determining an initial CoB for the image based on the adjusted notional weights of the image pixels using static mechanical methods;

(5) assigning a color weight coefficient to each color, which coefficients also may be related to the psychology and neuroscience of human vision, for each image pixel (color weight coefficients described the relative weight of each color to another, i.e., red to blue, etc.) and recalculate the CoB to determine a first order CoB;

(6) determining an eccentricity, E, of the CoB with respect to a center of the image (image balance ratio), principal axis, rule of thirds axis and power point, etc. (and any weighted combination) in order to determine an aesthetic quality of the image;

(7) optionally, re-assigning the center of the image as the first order CoB and re-calculating the location coefficient (8) optionally, repeating steps (3) thru (7) until the iterations converge in order to determine a second order CoB; and (9) using such notional mass data, calculate a loading diagram that could be used for a loaded simply supported plate with constant material properties using finite element methods and output heat map diagrams of weight/stress/deflection distribution and loads which identify the various view focus points and can be used in image saliency detection.

Figure 2:
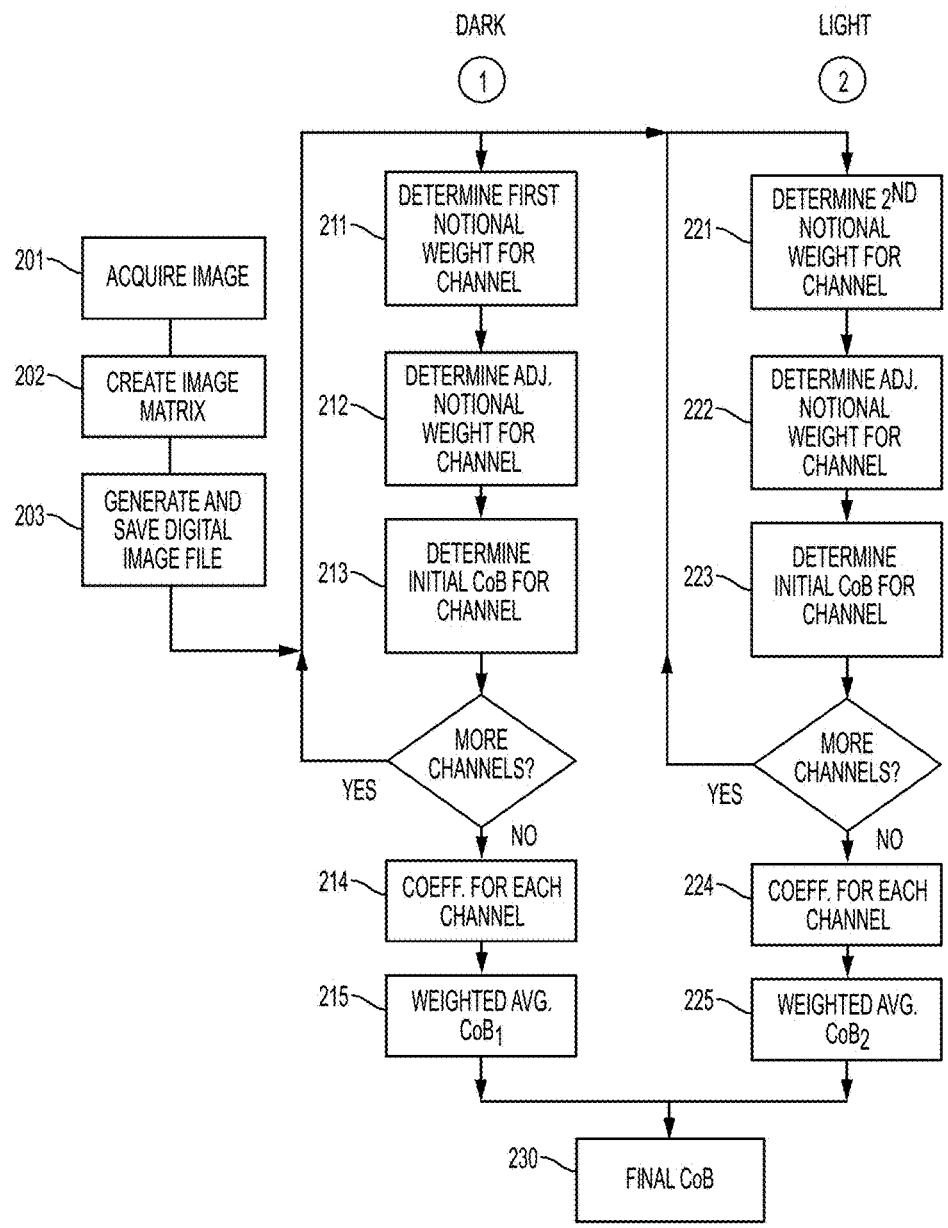
FIG. 2 is a flow diagram illustrating a process for determining a center of balance for a digital image.

FIG. 2 provides additional disclosure for the process described above. The flow diagram of FIG. 2 illustrates example elements of method of processing a digital image to assess image quality. Referring to FIG. 2, an imaging device (i.e., a camera) will acquire and capture an image (step 201). The camera will generate an image matrix with pixel data representing the image (step 202). This may occur after the image is captured, or in real-time as the imaging device acquires the image. In addition, this may occur for one or more single images, or the images may be multiple frames of a video. Optionally, for any acquired image, the camera may create a digital image file to include the image matrix and save the digital image file to a memory device (step 203). The pixel data may include, for each pixel: (1) coordinates such as (x, y) values; and (2) color values, each of which corresponds to a color channel of the pixel. If the image is a color image, the color channels may be R/G/B (red/green/blue) color channels corresponding to an RGB color model, and the color value represent an amount of each color component appears in the pixel. The color values of each pixel in an RGB color model will be from 0 to 255. If the image is a greyscale image, a single color channel may be used, zero may be taken to be black, 255 is taken to be white, and values in between representing various shades of gray. Other color value schemes may be used.

A processor of an image processing system will access and process the digital image file. For each of the color channels, the processor will determine a first notional weight for each pixel that is associated with the color channel (step 211). The first notional weight will be the color value or a function of the color value of the pixel. In some embodiments, for each pixel (x, y) the first notional weight w(t) may be determined as $w(t)=255-t$, wherein t is the color value (e.g., RGB value or greyscale value) of the pixel for that channel. Optionally, the system may save the notional weights for each data to be displayed in a heat map or other presentation, in which the notional value of each pixel is used to select a color (as determined by a lookup table or other method) that will be displayed in the pixel in the heat map. For example, pixels with relatively high notional weights may be displayed in various shades of red, while pixels with relatively low notional weights may be displayed in various shades of blue.

For each of the color channels, the system will then calculate an adjusted notional weight (step 212). In some embodiments, the adjusted notional weight $w(t)_{adj}$ may be determined as $w(t)_{adj}=C*L*w(t)$, in which the first notional weight $w(t)$ is adjusted by an edge coefficient C having a value corresponding to a proximity of the pixel to a detected edge in the image, and a location coefficient L having a value corresponding to a proximity of the pixel to a determined point of interest in the image.

The edge coefficient C may be retrieved from a memory, or the system may determine the coefficients using other processes. For example, to account for the higher attraction of image edges and certain regions of the image, pixel weights of certain pixels may be increased based on proximity to an edge and their general location within the image frame. Any edge detector algorithm such as "Canny" edge detector can be used to locate image edges and their relative strengths. The edge coefficient C may then be calculated based on calibration using established works of art and design. This can also be achieved by analyzing a database of images, such as images that have an associated high (i.e., above a threshold) ranking from users.

The location coefficient L may be obtained in manners similar to those discussed above for the edge coefficient C. L increases or decreases the weight of a pixel based on where the pixel occurs. As an example, the center third of the image can be given a higher weight due to the fact that the viewer's gaze seems to focus more on this area. The location coefficient can also be adjusted given the location of a pixel or group of pixels (blob) to other groups of pixels. As with the edge coefficient C, the edge coefficient L may be based on calibration using established works of art and design. It can also be achieved by analyzing a database of images, such as images that have an associated high (i.e., above a threshold) ranking from users.

The system will then determine an initial CoB for each color channel as a function of the adjusted notional weights of each of the pixels associated with the color channel (step 213). The function to determine the initial CoB for each color channel may, in some embodiments, include determining the initial CoB to equal:

$$CoB_{x,y} = \frac{\sum_{i=1}^{n}(x_i, y_i)*w_i(t)_{adj}}{\sum_{i=1}^{n} w_i(t)_{adj}}$$

wherein: i represents each pixel in the image, n is the total number of image pixels that are associated with the color channel; $(x_i, y_i)$ represents coordinates in the image of each pixel that is associated with the color channel (with $x_i$ being the x-coordinate of pixel i and $y_i$ being the y-coordinate of pixel i); $w_i(t)_{adj}$ is the adjusted notional weight of each pixel that is associated with the color channel; and $CoB_{x,y}$ represents the location (x, y) of the CoB. The equation above will be solved twice, once for x and once for y, so that the coordinates of the CoB are the resulting $CoB_x$ and $CoB_y$.

If the image is a 3D image rather than a 2D image, then the same formula may be used with each i representing a volumetric pixel (i.e., a voxel) and $(x_i, y_i, z_i)$ representing coordinates of the voxel, thus the following equation will be solved for x, y and z:

$$CoB_{x,y,z} = \frac{\sum_{i=1}^{n}(x_i, y_i, z_i)*w_i(t)_{adj}}{\sum_{i=1}^{n} w_i(t)_{adj}}$$

If additional channels exist for which an adjusted notional weight has not yet been determined, the system will repeat steps 211-213 for the remaining channels to yield an initial CoB for each channel. The system will then determine an average CoB (step 215) for the image based on the determined first CoBs for each of the color channels. The average determined in step 215 may be a weighted average in which the channels are assigned different weights, or each channel may be given the same weight.

If the image includes a single color channel (such as greyscale), the average CoB may simply be the sole initial CoB. In RGB or other multi-channel images, the system may determine the average RGB (step 215) as a weighted average of the initial CoBs for each channel. The system may determine a color coefficient (i.e., a weight) for each channel (step 214). The color coefficients may be retrieved from a memory, or determined using any suitable process. If color coefficients are available, the system may determine the weighted average in step 215 by multiplying each channel's CoB by its color coefficient, summing the weighted CoBs, and dividing the sum total by the number of channels. If no color coefficients are available, then the system may simply determine the weighted average as the average of the CoBs.

In some embodiments, the weighted average CoB determined in step 215 may be considered to be a final CoB. In other embodiments steps 211-214 may be performed to determine a "dark" CoB ($CoB_1$), which represents (in computer vision embodiments) a CoB corresponding to the human eye's rod cell function. This process may yield the final CoB. The system may perform, similar steps to determine a "light" CoB ($CoB_2$) that can be considered to correspond to the human eye's cone cell function. The final CoB may be a function of the light and dark CoBs. The final CoB may be a weighted combination of $CoB_1$ and $CoB_2$. For example, if an image contains more relatively light pixels it may assign more weight to $CoB_1$ for a dark channel, and if an image contains relatively more dark pixels it may assign more weight to the light channel, $CoB_2$.

For example, if the system determines both a dark $CoB_1$ and a light $CoB_2$, in step 221 the processor may determine a second notional weight for each pixel. The second notional weight will be the color value or a function of the color value of the pixel, and it will be different than the first notional weight for the pixel. For example, if the first notional weight, dark, $w(t)_1$ for the pixel is determined as $w(t)_1=255-t$, then the second notional weight, light, $w(t)_2$ may simply equal t. Optionally, although not necessarily, for each of the color channels, the system may again calculate an adjusted notional weight (step 222) as described above. The system will then determine a second center of balance (CoB) for each color channel as a function of the adjusted notional weights of each of the pixels (step 223) as described above. If additional channels exist for which an adjusted notional weight has not yet been determined, the system will repeat steps 221-223 for the remaining channels to yield an initial CoB for each channel. The system will then determine a second (weighted) average CoB (step 225) for the image, optionally using weights (step 224) for each color channel. The system may then determine the final CoB (step 230) as a function of the first and second weighted average CoBs, such as by determining a weighted average of the first weighted average $CoB_1$ and the second weighted average $CoB_2$. Color weights and light/dark weighting may be calibrated and/or determined based on data in a data set such as analyses of established works of art and design, previous rankings of images from a user, or a data set of images arranged by multiple users.

The system's identification of a CoB may have any of several practical applications. For example, the CoB determination may be used to improve manual or automated image capture. The system may store data indicating an optimal CoB in an image. The optimal CoB may be a point in the image, or a location. The optimal CoB also may vary based on detected image content (i.e., landscape vs. people). The system may determine whether the final CoB is proximate to (i.e., within a threshold distance from) the optimal CoB in the image. If the final CoB is not proximate to the optimal CoB, the system may cause the camera to output an instruction to prompt a user of the camera to adjust a position or a zoom setting of the camera, as well as to capture a second image after the position or the zoom setting is adjusted. Alternatively, the system may generate and output an instruction to cause the camera to automatically adjust a position or a zoom setting of the camera, as well as to capture a second image after the position or the zoom setting is adjusted.

In addition, the system may use the final CoB to determine an aesthetic score for the image, and it may cause a user interface to output the aesthetic score.

The aesthetic score may be determined in any number of ways. In some embodiments, the system may measure an eccentricity of the final CoB based on a distance of the final CoB from a specified location in the image; and it may then calculate the aesthetic score as a function of the determined eccentricity. The specified location may be, for example, a center of the image, a major axis of the image, a rule of third power point in the image, or any weighted combination of such points.

Figure 3:
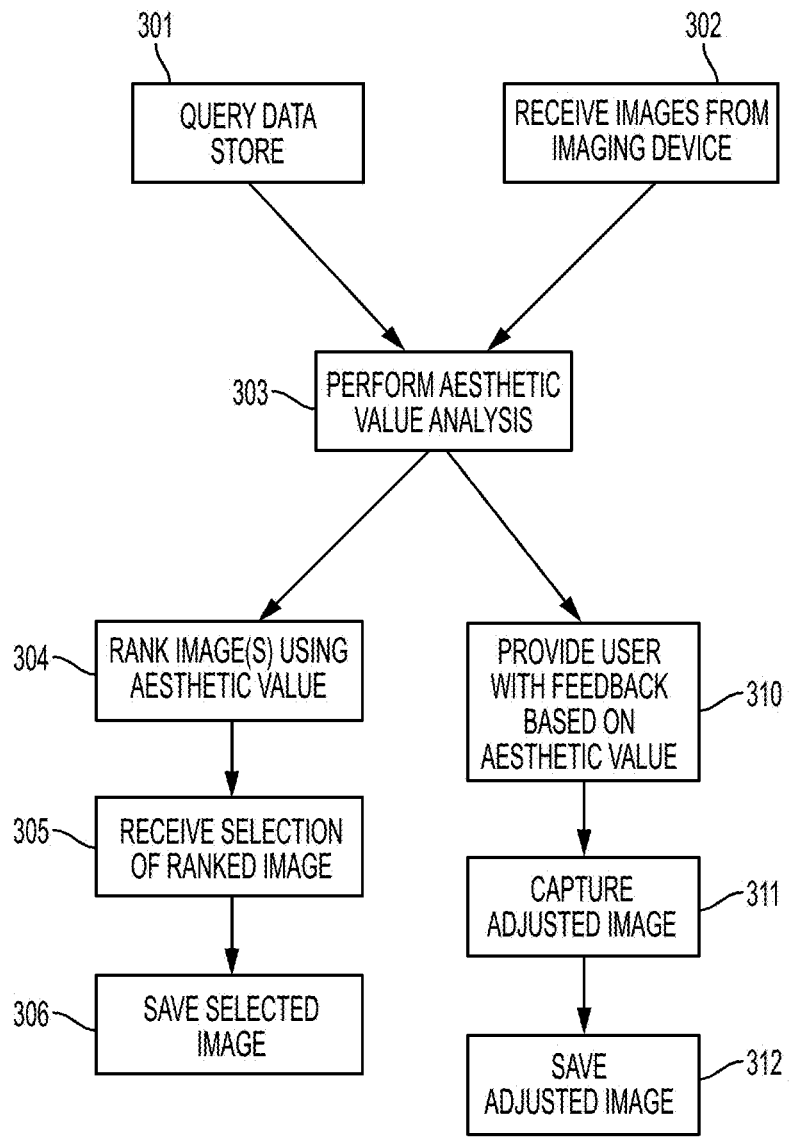
FIG. 3 is a flow diagram illustrating a process of determining aesthetic value of an image and/or providing a user with feedback for an image capture or editing process based on a center of balance determination.

FIG. 3 is a diagram depicting processes that may perform an image aesthetic value analysis using the CoB determination discussed above. As mentioned in FIG. 2, the system may receive a digital image by querying a data store 301 and retrieving it from the data store. The system also may receive images from an imaging device 302, whether after captured or in real-time as they are being acquired. The system will pre-process the image to obtain an image matrix. The system may then perform an aesthetic value analysis 303 on the image matrix as will now be described.

Figure 4:
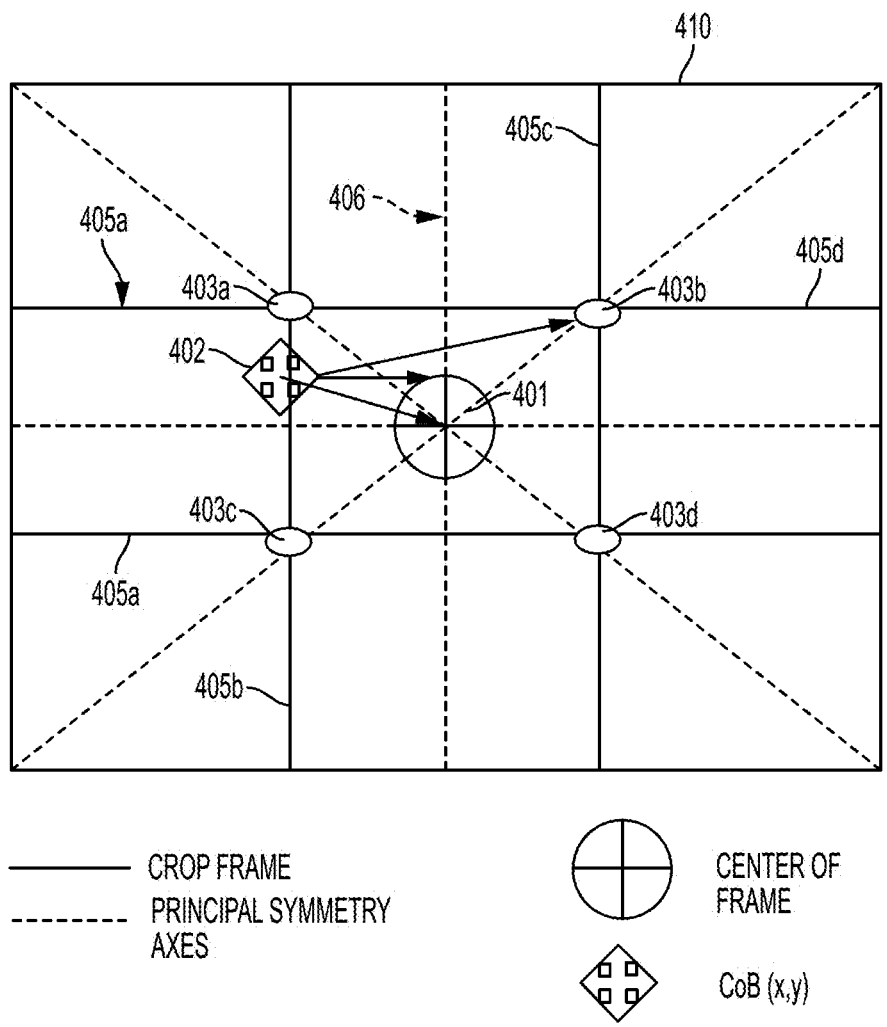
FIG. 4 illustrates an example of eccentricity calculation.

In some embodiments, the system may measure the aesthetic value to be, or to be a function of, a measure of eccentricity of the image's CoB to a specified location of the image. FIG. 4 illustrates how the system may determine an eccentricity of the image's CoB 402 to a specified location. In this example, the specified location could be the geometric center 401 of the image frame, as shown by the dotted lines that represent the principal axis of symmetry of the image (which are shown as dotted lines). In this example the distance (x, y) from the CoB 402 to the geometric center 401 is the eccentricity. Alternatively, the specified location may be any of the rule of thirds power points 403$a$ . . . 403$d$ of the image. The units of eccentricity may be standard units of measurement (millimeters, etc.), pixels, percentage offset, or other units. Optionally, the system may output a visual indicator of the eccentricity value, such as by outputting a numeric indicator, a bar or other shape showing the eccentricity's percentage value (as visually compared to 100%), or some other indicator. (Lower eccentricity indicates a higher visual indicator corresponding to a higher aesthetic value.)

In some embodiments, the specified location may include multiple locations, such as the geometric center 401 of the image frame 410, a position of the vertical axis of symmetry of the image frame 410 that is closest to the CoB, and/or one or more of the rule of thirds power points 403$b$. A rule of thirds power point is a location where one rule of thirds axis 405$a$ . . . 405$d$ intersects with another rule of thirds axis, with each rule of thirds axis representing the line formed by segmenting the image frame into vertical and horizontal thirds. In this example the final eccentricity value will be a function of the individual eccentricity measurements, such as an average, a weighted average or a sum of the individual eccentricity measurements. (Lower eccentricity indicates a higher visual indicator corresponding to a higher aesthetic value.)

In some embodiments eccentricity may be determined as the distance from the image's final CoB to a specified location. In other embodiments the system may first determine eccentricity for each color channel by calculating the distance between each color channel's CoB to the specified location, and then calculating the final eccentricity as an average, weighted average, sum or other function of the color-channel-specific CoBs.

Returning to FIG. 3, the system may determine the aesthetic value of an image 303 as a function of the eccentricity. In general, lower eccentricity will correspond to a higher aesthetic value. Thus, the function may be that the aesthetic value is an inverse of the eccentricity, a maximum value minus the eccentricity, or another function (for example, represented as a percentage on a 0-100 scale, with an aesthetic value of 0% being considered the worst and an aesthetic value of 100% being considered the best). The system also may consider additional characteristics of the image or other in the aesthetic value determination, such as originality, visual feature extraction, color distribution, ratings by human users and/or other characteristics and/or data. The system may output a visual indicator of the eccentricity value and/or the aesthetic value, either as a numeric value or a graphic indicator such as a bar graph.

The result of the aesthetic value analysis may be used in multiple applications. For example, if the system determines the aesthetic value for multiple images, the values may be used to assist a human or automated system to select an image from a corpus of candidate images. The system may use the aesthetic value to rank the images in the corpus 304, such as by high to low, and it may then present the candidate images to a user in that ranged order for selection. The ranking process 304 also may consider images having an aesthetic value above a threshold to be candidate images and presenting all such candidates to a user or system for selection. Optionally, additional rules may be used in the ranking determination, such as rules requiring that all ranked images date of image capture that is after (or before) a certain date, a requirement that candidate images contain a particular category of information, or other rules. The system may output the candidates to a user for selection via a display device and receive a selection of one of the images 305 by the user or by an automated system. The system may then save the selected image to a memory 306 and/or use it in a process such as one that prints the image, transmits the image to another party via a communication network, includes the image in a digital document, or in other processes. Optionally, to help conserve storage capacity the system may automatically delete images from a data store if they do not meet the aesthetic value threshold. In this situation, optionally the system may present these below-threshold aesthetic values to a user via a user interface as candidates for deletion. If so, the system may require the user to enter a confirmation that the images should be deleted, or the system may automatically delete each of these below-threshold images unless the user inputs an indication that a particular image should remain saved in the data store. Optionally, the system may use any suitable image recognition processes to identify similar images, and it may select and save the image having the highest aesthetic value while deleting the other similar images. In addition, the system may automatically transmit images that are at or above the aesthetic value threshold to a remote data store, but require the user to input confirmation before transmitting any below-threshold images to the remote data store, thus saving bandwidth and data usage.

Figure 5A:
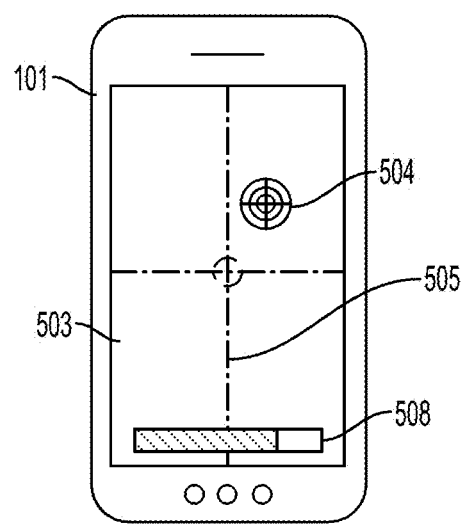
FIGS. 5A and 5B show how the result of a center of balance and/or aesthetic value determination may be used in an image capture process.

This system also may provide a user of an image capture device, or the device itself, with real-time feedback on the image capture process based on the aesthetic value 310. For example, referring to FIG. 5A, the system may process an image as it is being captured by an imaging device of an electronic device 101 to determine the aesthetic value. The system may then cause a display device 503 of the electronic device 101 to output feedback such as an augmented reality overlay on an acquired image showing the location of the final CoB 504 for the image. The augmented reality overlay also may include guidance features such as gridlines 505 to help the user see when the CoB is in the geometric center (or other specified location) of the image frame. The user can then adjust the CoB and capture the image when CoB corresponds to the desired guidelines or simply capture the image when the visual indicator is showing a higher aesthetic value. FIG. 5A also illustrates that the user interface may output a visual indicator 508 of the eccentricity and/or aesthetic value. The visual indicator 508 may be a bar graph as shown, with the percentage of the bar that is filled corresponding to the percentage value of eccentricity or aesthetic value. Other visual indicators, such as numeric values, gauges, line of varying lengths and/or widths, and/or color-changing indicators may be used.

Figure 5B:
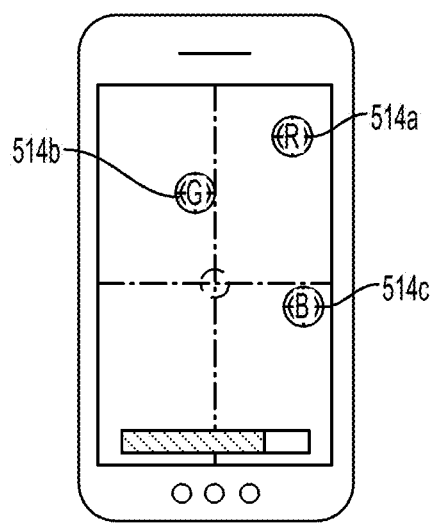

In addition or alternatively, referring to FIG. 5B, the system may cause the display device to output the initial CoBs for each color channel (R,G,B) 514a, 514b, 514c to illustrate the CoB for each color. With this option the CoBs for each color channel gravitate toward areas where the channel's color is more prevalent in the image.

Figure 7:
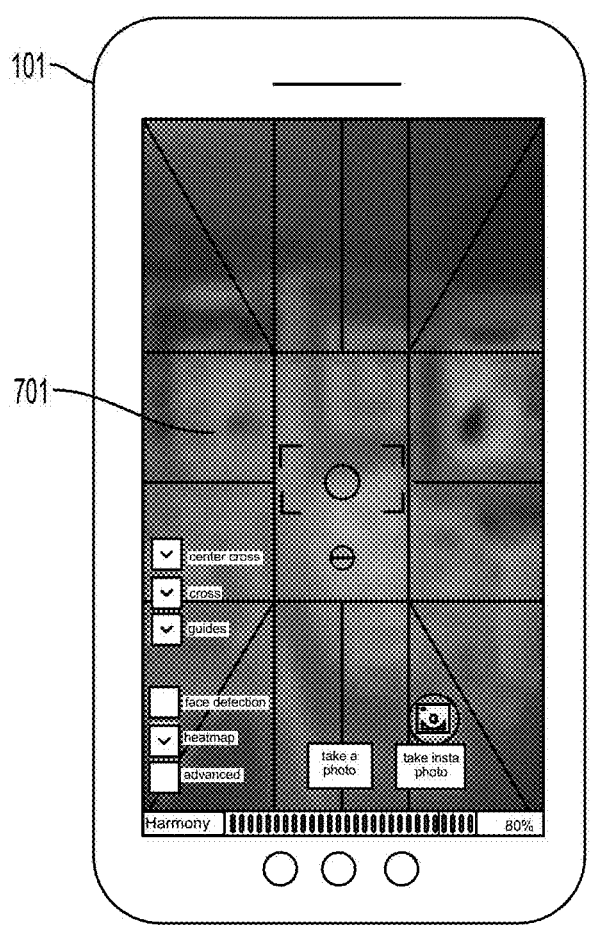
FIG. 7 illustrates an example of a saliency heat map that is derived from adjusted pixel weights that are determined using processes described in this document.

In addition, in some embodiments the system may include a heat map function in which the system causes a display of an electronic device to display a visual gradient map (i.e., a heat map) showing each pixel in the image as a color having a value that corresponds to the adjusted notional weight values determined using the process described above. FIG. 7 illustrates an example in which electronic device 101 displays a heat map 701 in real-time of an acquired image utilizing contours indicating various pixel weights. (Although FIG. 7 appears in greyscale in this patent document, the actual heat map will be multi-colored.) The system may determine the color value for each pixel from a look-up table, as a function of the adjusted notional weight values, as having a value that is equal to the pixel's adjusted notional weight value, or by some other procedure. The heat map may help the user visualize salient regions in that salient regions may be represented by a heavy concentration of a particular color.

Returning to FIG. 3, if the aesthetic value is below a threshold value the device may output a prompt to a user to adjust a position or other setting of the imaging device and frame an adjusted image 311 until the user captures an image having an aesthetic value that meets or exceeds the threshold. The system also may automatically operate the imaging device capture 311 and save 312 adjusted images until the imaging device captures an image having an aesthetic value that meets or exceeds the threshold. Optionally, each time that the user acquires an image having a higher aesthetic value than previously-captured similar images, it may delete the previously-captured similar image and save only the newly acquired image. In this case, similarity may be determined based on a measure of time (e.g., taken within a threshold number of seconds or milliseconds of each other), by image content recognition processes, both of these and/or other processes.

Aesthetic value determination may be used in various applications. For example, a camera application may include instructions to use output an augmented reality overlay (such as that shown in FIG. 5A or 5B to help a user acquire a more aesthetically pleasing image). The programming instructions may combine this feature with other technologies, such as face detection technologies, to identify the edges of a subject's face and provide the CoB feedback to the user for the optimal location of the face CoB with respect to the entire face. Similarly, the programming instructions provide the CoB feedback to the user only when the subject's face is completely within the image and/or the CoB is within the subject's face. This may help a user capture more aesthetically pleasing "selfie" images and/or other images of human subjects. The system may automatically capture and save an image when certain criteria are met, such as the CoB being at or within a threshold range of a target location, the CoB is within the subject's face, the aesthetic score meets a threshold, and/or other criteria.

In addition, the aesthetic value determination may be used to automatically select an image from a sequence of images acquired as a video sequence or via a burst mode. If so, the system may impose one or more rules before it will select and save an image from the set, such as a rule requiring that the aesthetic value exceed a threshold, and optionally also a rule requiring that the CoB of the image be within the subject's face. These options may help conserve memory on the device, and also reduce bandwidth usage required for uploading images to a photo storage service, by reducing the total number of image files saved and uploaded to only those images meeting specified aesthetic and/or other criteria.

The aesthetic value also may be used in editing, such as in a cropping function to enable a user to crop an image to yield a more aesthetically composed image. When cropping an image in edit mode, the user may adjust the crop area so that the CoB for the selected region is aligned with desired guidelines before capturing the adjusted cropped image. The system may display guidelines as an overlay on the screen so that the user can select various guidelines to serve as crop borders, and see (in real-time) where the CoB is located within the various border options that the guidelines may provide, In addition, the system may acquire images (such as images of web pages, video stills or other content) and use the CoB and/or adjusted notional weights as a recommended location to place content (such as an ad or product). For example, the system may recommend the CoB for insertion of content. The system also may recommend a location of highest adjusted notional weight, a location where the adjusted notional weight exceeds a threshold, an area surrounding such a location, or a group of contiguous pixels whose average adjusted notional weight is the highest in the image or which is above a threshold. The system may also automatically insert or overlay selected content at the CoB, or at a location selected based on adjusted notional weights as described above, to help the content be placed at a location to which a viewer's focus will be drawn. The content may be an image, text, animated graphic, video or other material. The system may identify and acquire the content from a user input, from a data store with a content library, or from some other source. The system may then save a digital file containing the image, modify the content appearing at the CoB, or it may cause a display device to display the image with the content overlaid on the image at the CoB.

Figure 6:
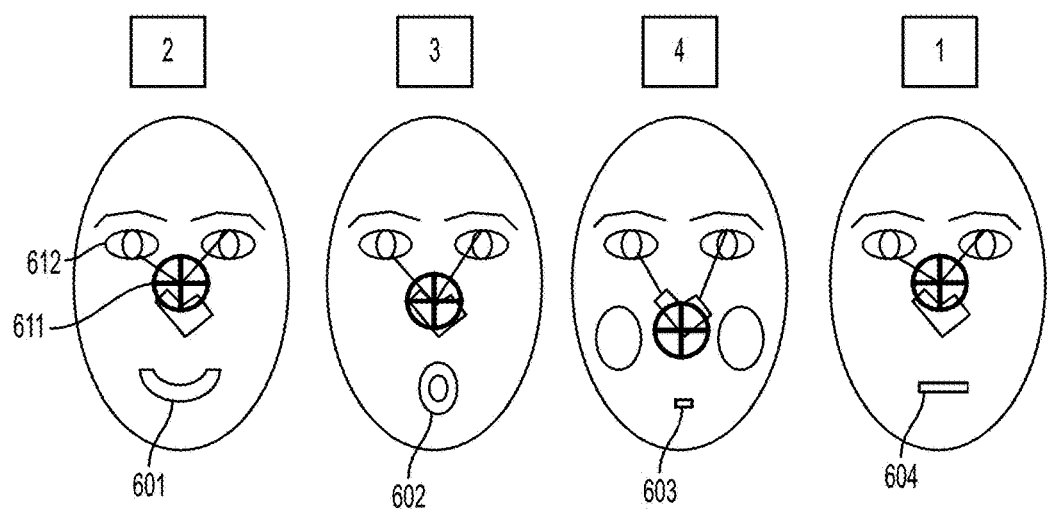
FIG. 6 illustrates how image center of balance determinations may be used as a code for gaining access to a secure system.

In addition to aesthetic value determination, another application of the CoB determination process is use in facial recognition processes or other processes in which users enter tokens, codes and/or biometric data to gain access to a secure system. The CoB of a person's face may be used to establish a code that can be used as a password to gain access to the secure system. For example, referring to FIG. 6, the CoB of a person's face will change as the person makes certain facial movements, such as movement of the mouth, nose or eyes. The CoB locations of the images of a known user's face in certain movement positions may be associated with various codes or characters, such that movement of the user's face will result in entry of the characters as part of an access request. These associations may be stored in a look-up table, access control list, or other data structure in a data store. In FIG. 6, a movement corresponding to a smile 601 results in the CoB 611 being in a first location, which the system associates with code number 2. Movement corresponding to an o-shape mouth 602 moves the CoB slightly downward by a measureable amount, which location the system associates with code number 3. Movement in which the user purses his/her lips 603 moves the CoB even further downward to a location that the system associates with code number 4. Movement in which the user maintains an expressionless face 604 moves the CoB up to its highest location, which the system associates with code number 1. Thus, this sequence of facial movements will result in entry of the code 2-3-4-1 when recognized by a facial recognition system that includes an imaging device and processor with applicable programming instruction. The system may use the actual CoB of the image in this determination, or it may measure a distance, vector or other unit of measure that relates the CoB of the image to a reference point 612 or reference points such as one or both of the face's eyes. Relation of the CoB 611 to a reference point 612 will help account for the fact that the CoB 611 may appear at different locations in the image depending on whether or not the user's face is centered in the image, and the image CoB 611 may change depending on the location of the user's face. In addition to determining the CoB the system may use facial recognition, a token (such as an access card) or an entered identifier for the user to identify the user. The user identifier and the code corresponding to the user's sequence of facial expressions may together comprise access credentials. If the code corresponding to the user's sequence of facial expressions matches an expected security code for the user, the system may grant the user access to one or more locations or services. The system may enable the user to change this security code, as desired, by selecting a security code reset mode and entering a new the sequence of facial movements, thereby overcoming a major concern with biometric access codes which are fixed on certain non-changeable user features.

Figure 8:
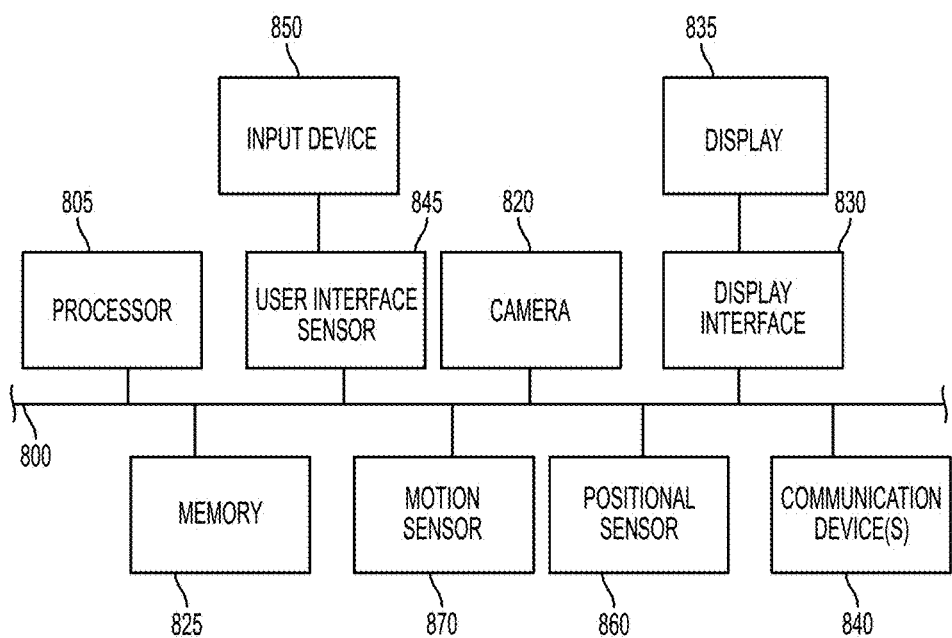
FIG. 8 illustrates example elements of an electronic device that may serve as a component of the systems described below.

FIG. 8 depicts an example of internal hardware that may be included in any of the electronic components of the system, such as the user's smartphone or a local or remote computing device in the system. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored.

An optional display interface 830 may permit information from the bus 800 to be displayed on a display device 835 in visual, graphic or alphanumeric format. An audio interface and audio output (such as a speaker) also may be provided. Communication with external devices may occur using various communication devices 840 such as a wireless antenna, an RFID tag and/or short-range or near-field communication transceiver, each of which may optionally communicatively connect with other components of the device via one or more communication system. The communication device 840 may be configured to be communicatively connected to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. Digital images may be received from a camera 820 that can capture video and/or still images. The system also may include a positional sensor 860 and/or motion sensor 870 to detect position and movement of the device. Examples of motion sensors 870 include gyroscopes or accelerometers. Examples of positional sensors 860 include a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of processing a digital image to assess image quality, the method comprising, by a processor:
   accessing a digital image containing pixel data representing a digital image, wherein:
      the pixel data comprises one or more color values for each pixel of a group of pixels, and each color value corresponds to a color channel, such that each of the pixels is associated with a color channel that corresponds to the color value in the pixel data for the pixel;

for each of the color channels:

determining a first notional weight for each pixel that is associated with the color channel, wherein the first notional weight is the color value or a function of the color value of the pixel, for each pixel that is associated with the color channel, determining an adjusted notional weight for the pixel by adjusting the first notional weight for the pixel by (i) an edge coefficient having a value corresponding to a proximity of the pixel to a detected edge in the digital image, and (ii) a location coefficient having a value corresponding to a proximity of the pixel to a determined point of interest in the digital image, and determining an initial center of balance (CoB) for the color channel as a function of the adjusted notional weights of each of the pixels that are associated with the color channel;

determining a final CoB for the digital image based on the initial CoBs for each of the color channels; and using the final CoB to cause a device to take an action.

2. The method of claim 1, wherein:

the color channels comprise R, G and B channels in accordance with an RGB color model; and determining the final CoB for the digital image based on the initial CoBs for each of the color channels comprises determining a weighted average of the initial CoBs for each of the color channels.

3. The method of claim 1, wherein:

the color channels consist of a single greyscale color channel; and determining the final CoB for the digital image comprises determining that the initial CoB for the single greyscale color channel is the final CoB.

4. The method of claim 1, wherein the image is a two-dimensional image, and determining the initial CoB for each color channel comprises determining the initial CoB for each color channel to be:

$$CoB_{x,y} = \frac{\sum_{i=1}^{n}(x_i, y_i) * w_i(t)_{adj}}{\sum_{i=1}^{n} w_i(t)_{adj}}$$

wherein:

i represents each pixel that is associated with the color channel, and n is a number of pixels that are associated with the color channel;

$(x_i, y_i)$ represents coordinates in the digital image of each pixel that is associated with the color channel;

$w_i(t)_{adj}$ is the adjusted notional weight of each pixel that is associated with the color channel; and $CoB_{x,y}$ represents a location (x,y) of the CoB.

5. The method of claim 1, wherein the image is a three-dimensional image, and determining the initial CoB for each color channel comprises determining the initial CoB for each color channel to be:

$$CoB_{x,y,z} = \frac{\sum_{i=1}^{n}(x_i, y_i, z_i) * w_i(t)_{adj}}{\sum_{i=1}^{n} w_i(t)_{adj}}$$

wherein:

i represents each image element that is associated with the color channel, and n is a number of image elements that are associated with the color channel;

$(x_i, y_i, z_i)$ represents coordinates in the digital image of each pixel that is associated with the color channel;

$w_i(t)_{adj}$ is the adjusted notional weight of each pixel that is associated with the color channel; and $CoB_{x,y,z}$ represents a location (x,y,z) of the CoB.

6. The method of claim 1, wherein, for each of the color channels:

determining the first notional weight for each pixel comprises determining the first notional weight for the pixel as $w(t)_1 = 255-t$, wherein t is the color value for the color channel of the pixel;

the method further comprises determining a second notional weight for the color channel as $w(t)_2 = t$;

determining the initial CoB for the color channel comprises using the adjusted notional weights to determine a first CoB for the color channel and using additional adjusted notional weights based on the second notional weight to determine a second CoB for the color channel; and determining the final CoB for the color channel comprises determining a weighted average of the first CoB and the second CoB for the color channel.

7. The method of claim 1, further comprising, by a camera:

using an image sensor to acquire the digital image; and generating an image matrix comprising the pixel data representing the digital image.

8. The method of claim 7, wherein using the final CoB to cause a device to take an action comprises:

determining whether the final CoB is proximate to an optimal CoB in the digital image; and if the final CoB is not proximate to the optimal CoB, cause a user interface of the camera to:

output an instruction to prompt a user of the camera to adjust a position or a zoom setting of the camera, and acquire a second digital image after the position or the zoom setting is adjusted.

9. The method of claim 1, wherein using the final CoB to cause a device to take an action comprises:

using the final CoB to determine an aesthetic score for the digital image; and causing a user interface to output the aesthetic score.

10. The method of claim 9, wherein using the final CoB to determine an aesthetic score for the digital image comprises:

determining an eccentricity of the final CoB based on a distance between the final CoB and a specified location in the digital image; and calculating the aesthetic score as a function of the determined eccentricity.

11. The method of claim 10, wherein the specified location comprises a point that is the center of the digital image, a point that is on a major axis of the digital image, a rule of third power point in the digital image, or a function of any or all such points.

12. The method of claim 9, further comprising using the aesthetic score to provide, via a user interface of an electronic device, feedback for an image capture or editing process.

13. The method of claim 12, wherein using the final CoB to cause a device to take an action further comprises one or more of the following:
- causing a display device to a output visual indicator of the eccentricity;
- causing a display device to a output a visual indicator of the aesthetic score; or
- causing a display device to a output an augmented reality overlay showing the CoB on the digital image.

14. The method of claim 12, wherein using the final CoB to cause a device to take an action further comprises causing a display device to a output an augmented reality overlay showing the CoB on the digital image, and the method further comprises:
- displaying guidelines on the display that outputs the digital image and the augmented reality overlay; and
- enabling a user of an electronic device that includes the display to use the guidelines to crop the digital image.

15. The method of claim 9, wherein using the final CoB to cause a device to take an action further comprises using the aesthetic score to determine whether to retain the digital image in a data store by:
- determining whether the aesthetic score exceeds a threshold;
- determining whether the digital image contains a face of a subject;
- determining whether the final CoB appears within the face of the subject; and
- retaining the digital image in the data store only if the aesthetic score exceeds the threshold, the digital image contains the face of the subject and the final CoB appears within the face of the subject, otherwise deleting or not causing the digital image to be retained in the data store.

16. The method of claim 1, wherein using the final CoB to cause a device to take an action comprises:
- receiving a user identifier for a user whose face appears in the digital image; and
- identifying a code that corresponds to the final CoB; and
- using the user identifier and the code as credentials to permit the user to access a secure system.

17. The method of claim 1, wherein using the final CoB to cause a device to take an action comprises:
- identifying a content item;
- placing the content item in the image at the CoB to yield a modified image; and
- saving the modified image to a memory or causing a display device to output the modified image.

18. The method of claim 1, wherein using the final CoB to cause a device to take an action comprises causing a display of an electronic device to display a heat map that shows each pixel of the digital image as a color having a value that corresponds to the adjusted notional weight for that pixel.

19. A method of processing a digital image to assess image quality, the method comprising, by a processor:
- acquiring a digital image containing pixel data representing an image, wherein the pixel data comprises one or more color values for each pixel of a group of pixels;
- determining a notional weight for each pixel as the color value or a function of the color value of the pixel;
- using the notional weight for each pixel to determine a center of balance (CoB) for the digital image;
- determining an eccentricity of the CoB based on a distance between the CoB and a specified location in the digital image; and
- calculating an aesthetic score for the digital image as a function of the determined eccentricity; and
- using the CoB or aesthetic score to cause a device to take an action.

20. The method of claim 19, wherein using the CoB or aesthetic score to cause a device to take an action comprises using the aesthetic score to provide, via a user interface of an electronic device, feedback in an image capture or editing process.

21. The method of claim 19, wherein using the CoB or aesthetic score to cause a device to take an action comprises:
- receiving a user identifier for a user whose face appears in the digital image; and
- identifying a code that corresponds to the final CoB; and
- using the code as an element of an access code to access a secure system.

22. The method of claim 19, wherein using the CoB or aesthetic score to cause a device to take an action comprises:
- identifying a content item;
- placing the content item in the image at the CoB to yield a modified image; and
- saving the modified image to a memory or causing a display device to output the modified image.

23. A digital image processing system, comprising:
- a camera;
- a processor; and
- a computer-readable medium containing programming instructions that are configured to cause the processor to:
  - detect that the camera is acquiring a digital image containing pixel data representing an image, wherein the pixel data comprises one or more color values for each pixel of a group of pixels,
  - in real-time while the camera is acquiring the digital image:
    - determine a notional weight for each pixel as the color value or a function of the color value of the pixel,
    - use the notional weight for each pixel to determine a center of balance (CoB) for the digital image, and
    - use the CoB to cause a component of the system to take an action.

24. The system of claim 23, further comprising additional programming instructions that are configured to cause the processor to, in real-time while the camera is acquiring the digital image:
- determine an eccentricity of the CoB based on a distance between the CoB and a specified location in the digital image; and
- calculate an aesthetic score for the digital image as a function of the determined eccentricity.

25. The system of claim 23, further comprising:
- a display; and
- wherein the programming instructions to use the CoB to cause a component of the system to take an action comprise programming instructions that are configured to cause the processor to, in real-time while the camera is acquiring the digital image:
  - cause the display to output the digital image, and
  - cause the display to output an augmented reality overlay identifying the CoB.

* * * * *